US012681420B2

(12) United States Patent
Sato

(10) Patent No.: US 12,681,420 B2
(45) Date of Patent: Jul. 14, 2026

(54) IMAGE FORMING SYSTEM

(71) Applicant: Konica Minolta, Inc., Tokyo (JP)

(72) Inventor: Taku Sato, Hachioji (JP)

(73) Assignee: KONICA MINOLTA, INC., Tokyo (JP)

( * ) Notice: Subject to any disclaimer, the term of this patent is extended or adjusted under 35 U.S.C. 154(b) by 0 days.

(21) Appl. No.: 19/045,870

(22) Filed: Feb. 5, 2025

(65) Prior Publication Data

US 2025/0251692 A1 Aug. 7, 2025

(30) Foreign Application Priority Data

Feb. 7, 2024 (JP) ................................ 2024-017090

(51) Int. Cl.
*G03G 21/02* (2006.01)
*G03G 15/00* (2006.01)

(52) U.S. Cl.
CPC ......... *G03G 21/02* (2013.01); *G03G 15/5016* (2013.01); *G03G 15/5062* (2013.01); *G03G 15/55* (2013.01); *G03G 15/652* (2013.01); *G03G 15/6523* (2013.01); *G03G 2215/00455* (2013.01)

(58) Field of Classification Search
CPC ............... G03G 15/164; G03G 15/237; G03G 15/5062; G03G 15/6517; G03G 15/652; G03G 15/6523; G03G 15/6526; G03G 21/02; G03G 2215/00223; G03G 2215/00455; G03G 2215/00459
See application file for complete search history.

(56) References Cited

U.S. PATENT DOCUMENTS

2008/0181651 A1* 7/2008 Takesada ............. G06F 3/1241 399/82
2011/0211857 A1* 9/2011 Mikami ............ G06K 15/4065 399/82

FOREIGN PATENT DOCUMENTS

JP 2000147965 A 5/2000
JP 2008183815 A * 8/2008

* cited by examiner

*Primary Examiner* — Carla J Therrien
(74) *Attorney, Agent, or Firm* — CANTOR COLBURN LLP

(57) ABSTRACT

An image forming system includes: a sheet conveyance section configured to convey a rolled sheet; an image forming section configured to form an image on the rolled sheet; a winding section configured to wind the rolled sheet; and a hardware processor. The hardware processor is capable of changing a print counting position on a conveyance path between the image forming section and the winding section, the print counting position at which a print is counted based on the image formed on the rolled sheet.

13 Claims, 4 Drawing Sheets

351

| TYPE OF PRINT JOB | IMAGE STOP POSITION | PRINT COUNTING POSITION |
|---|---|---|
| NORMAL PRINT JOB | POSITION OF WINDING SECTION | POSITION OF WINDING SECTION |
| MANUAL ADJUSTMENT CHART PRINT JOB | POSITION OF SHEET CUTTING WORKTABLE | POSITION OF SHEET CUTTING WORKTABLE |
| PROOF IMAGE PRINT JOB | POSITION OF INSPECTION TABLE | POSITION OF INSPECTION TABLE |
| AUTOMATIC ADJUSTMENT CHART PRINT JOB | POSITION IMMEDIATELY AFTER PASSING IMAGE READING SECTION | POSITION IMMEDIATELY AFTER PASSING IMAGE READING SECTION |

FIG.4

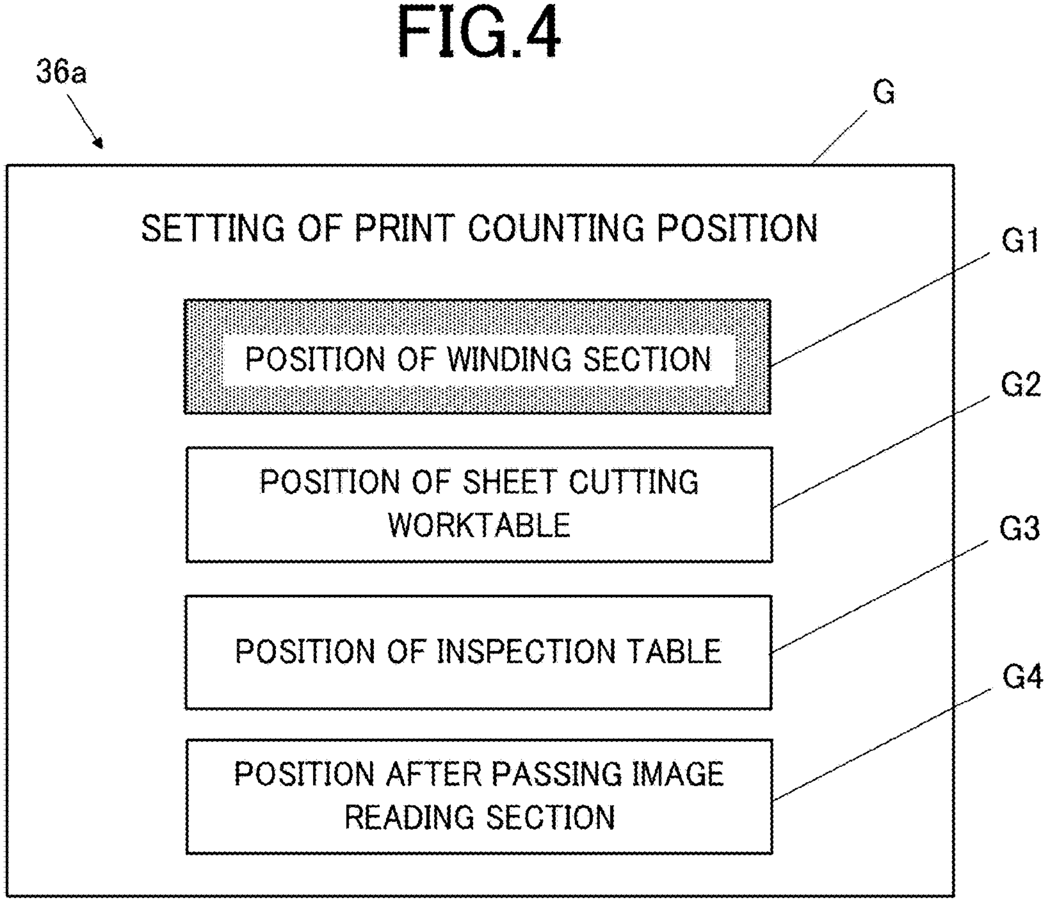

FIG.5

351

| TYPE OF PRINT JOB | IMAGE STOP POSITION | PRINT COUNTING POSITION |
|---|---|---|
| NORMAL PRINT JOB | POSITION OF WINDING SECTION | POSITION OF WINDING SECTION |
| MANUAL ADJUSTMENT CHART PRINT JOB | POSITION OF SHEET CUTTING WORKTABLE | POSITION OF SHEET CUTTING WORKTABLE |
| PROOF IMAGE PRINT JOB | POSITION OF INSPECTION TABLE | POSITION OF INSPECTION TABLE |
| AUTOMATIC ADJUSTMENT CHART PRINT JOB | POSITION IMMEDIATELY AFTER PASSING IMAGE READING SECTION | POSITION IMMEDIATELY AFTER PASSING IMAGE READING SECTION |

IMAGE FORMING SYSTEM

CROSS-REFERENCE TO RELATED APPLICATIONS

The present invention claims priority under 35 U.S.C. § 119 to Japanese Patent Application No. 2024-017090 filed on Feb. 7, 2024, the entire contents of which being incorporated herein by reference.

BACKGROUND OF THE INVENTION

Technical Field

The present invention relates to an image forming system.

Description of Related Art

A known image forming device includes a fee collecting device that calculates a printing fee corresponding to the number of prints and charges a user for the fee. Japanese Unexamined Patent Publication No. 2000-147965 discloses an image forming device that generates a copy count signal every time a copying operation for one sheet is completed and outputs the signal to a fee collecting device. Counting of copies (counting prints; print counting) is performed, based on whether a sheet has passed a sheet ejection sensor during the copying operation, namely whether the sheet has passed a predetermined position on the conveyance path.

SUMMARY OF THE INVENTION

There is also known an image forming system that includes: a sheet feed device that sends out a rolled sheet (continuous sheet) and feeds the sheet to an image forming device; the image forming device that forms an image on the rolled sheet; and a winding device that winds the rolled sheet ejected from the image forming device. The image forming system conveys the image formed on the rolled sheet (the last image when multiple images are printed) to an image stop position on the conveyance path and stops the image at the image stop position. The image stop position can be changed to any position between the image forming device and the winding device, depending on the type of print job. When such an image forming system counts prints according to the print counting disclosed in JP2000-147965A, the print count may be either more or less than it is supposed to be, depending on the image stopping position. Accordingly, an appropriate printing fee cannot be charged.

The present disclosure has been made in consideration of the above-described issue. An object of the present disclosure is to appropriately and accurately count prints in an image forming system that forms images on a rolled sheet.

To achieve at least one of the abovementioned objects, according to an aspect of the present invention, an image forming system reflecting one aspect of the present invention includes: a sheet conveyance section configured to convey a rolled sheet; an image forming section configured to form an image on the rolled sheet; a winding section configured to wind the rolled sheet; and a hardware processor capable of changing a print counting position on a conveyance path between the image forming section and the winding section, the print counting position at which a print is counted based on the image formed on the rolled sheet.

BRIEF DESCRIPTION OF THE DRAWINGS

The advantages and features provided by one or more embodiments of the invention will become more fully understood from the detailed description given hereinafter and the appended drawings which are given by way of illustration only, and thus are not intended as a definition of the limits of the present invention, wherein:

FIG. 4 is a flowchart of the control procedure of a print counting position setting process; and FIG. 5 is a diagram illustrating an example of a print counting position setting table.

DETAILED DESCRIPTION

Hereinafter, embodiments of the present invention will be described with reference to the drawings. However, the scope of the invention is not limited to the illustrated examples.

[Configuration of Image Forming System]

Figure 1:
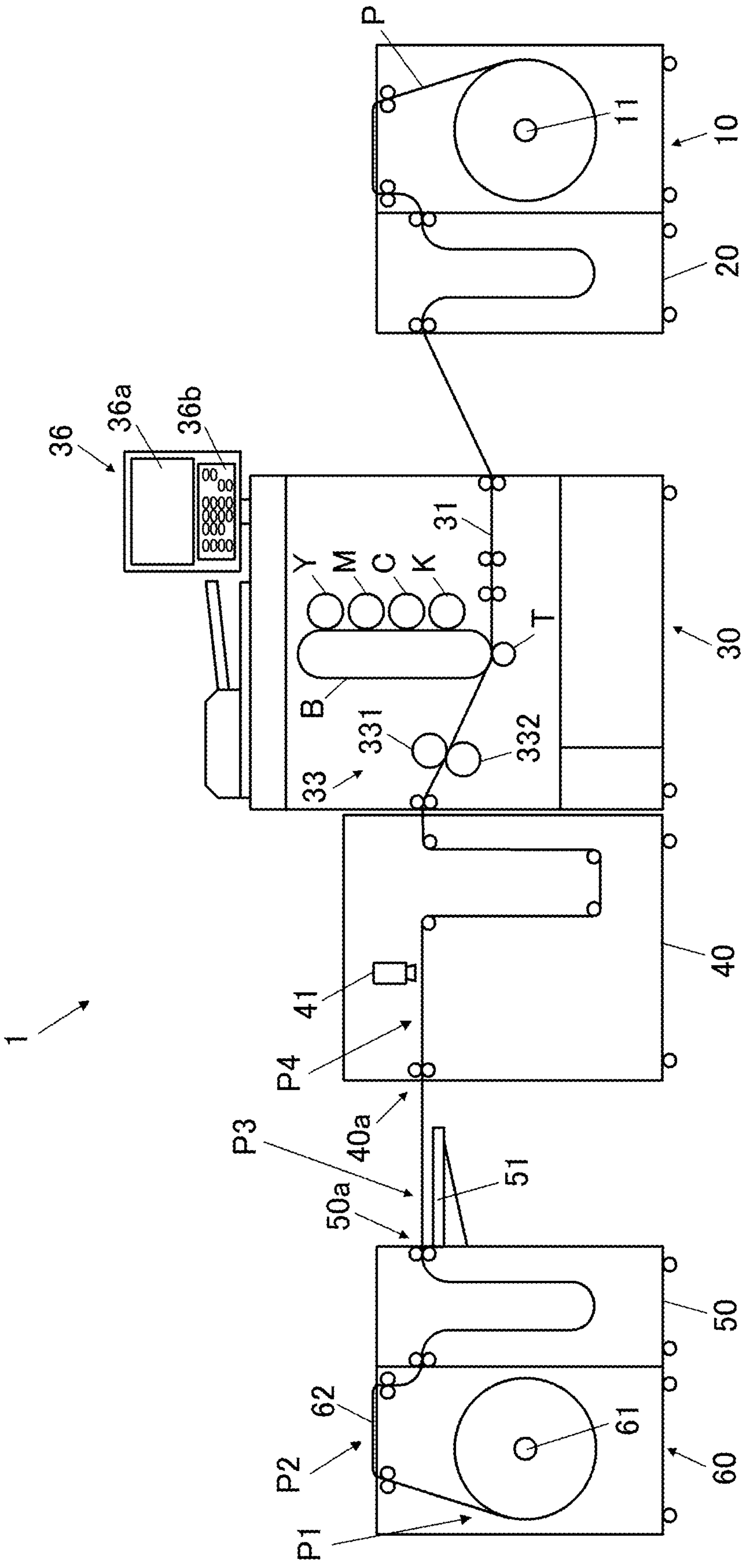
FIG. 1 is a diagram illustrating an example of the schematic configuration of an image forming system according to the present embodiment.

Firstly, the configuration of an image forming system according to the present embodiment is described. FIG. 1 shows an example of the schematic configuration of the image forming system 1.

The image forming system 1 uses continuous sheet (rolled sheet) P as a recording medium and forms images on the continuous sheet P.

As shown in FIG. 1, the image forming system 1 includes a sheet feed device 10, an image forming device 30, an image reading device 40, and a winding device 60 that are connected in this order from the upstream side along the conveyance direction of the continuous sheet P.

The sheet feed device 10 includes a sheet feed adjustment section 20 and feeds the continuous sheet P to the image forming device 30 via the sheet feed adjustment section 20. In the housing of the sheet feed device 10, a continuous sheet (rolled sheet) P is wound around a support shaft 11 and rotatably held, as illustrated in FIG. 1 as an example. The sheet feed device 10 conveys the continuous sheet P, which is wound around the support shaft 11, to the sheet feed adjustment section 20 via rollers at a constant speed. The continuous sheet P may not be held in a rolled state by the sheet feed device 10. For example, the sheet feed device 10 may hold the continuous sheet Pin a folded state. Although only one continuous sheet P is illustrated in FIG. 1, multiple continuous sheets may be held.

The sheet feed adjustment section 20 is a mechanism for conveying the continuous sheet P from the support shaft 11 to the image forming device 30. The sheet feed adjustment section 20 holds the continuous sheet P in the slack state as illustrated in FIG. 1 to absorb the difference between the conveyance speed of the continuous sheet P by the sheet feed device 10 and the conveyance speed of the continuous sheet P by the image forming device 30. Thus, the shed feed adjustment section 20 adjusts feeding of the continuous sheet P to the image forming device 30.

The image forming device 30 forms an image on the continuous sheet P. The image forming device 30 is disposed on the downstream side of the sheet feed device 10 and on the upstream side of the image reading device 40 in the conveyance direction of the continuous sheet P.

The image reading device 40 includes an image reading section 41. The image reading device 40 reads, with the image reading section 41, an image formed on the continuous sheet P conveyed from the image forming device 30 and generates image data. The image reading device 40 compares the generated image data with reference image data to inspect the color, the position, image errors, folding, and so forth of the formed image. The image reading section 41 is, for example, a scanner including an optical image sensor (e.g., a CCD or a CMOS) that includes a large number of regularly arranged reading elements.

The winding device 60 includes a winding adjustment section 50 and winds the continuous sheet P conveyed from the image reading device 40 via the winding adjustment section 50.

The winding adjustment section 50 delivers the continuous sheet P delivered from the image reading device 40 to the winding device 60. The winding adjustment section 50 holds the continuous sheet P in the slack state as illustrated in FIG. 1 to absorb the difference between the conveyance speed of the continuous sheet P by the image reading device 40 and the conveyance speed of the continuous sheet P by the winding device 60. Thus, the winding adjustment section 50 adjusts ejection of the continuous sheet P from the image reading device 40.

In the housing of the winding device 60, the continuous sheet P is wound around a support shaft 61 and held in a rolled state, as illustrated in FIG. 1 as an example. Specifically, in the winding device 60, the continuous sheet P from the winding adjustment section 50 on the conveyance path is conveyed via multiple rollers and wound around the support shaft 61 at a constant speed. The conveyance path is partly exposed on the top surface of the winding device 60 and then reenters the device.

A sheet cutting worktable 62 is provided on the conveyance path of the continuous sheet P on the top surface of the winding device 60. The sheet cutting worktable 62 has, for example, a cutting blade that is movable in the top-bottom direction and is long in the width direction of the continuous sheet P. Thus, the continuous sheet P can be cut at a predetermined position.

The winding device 60 is disposed at a predetermined distance from the image reading device 40. The continuous sheet P is exposed to the outside after being carried out from the carrying-out port 40*a* of the image reading device 40. The continuous sheet P is then conveyed while its bottom surface is supported by the inspection table 51 of the winding adjustment section 50. The continuous sheet P is then carried into the winding adjustment section 50 from the carrying-in port 50*a* of the winding adjustment unit 50.

Next, the configuration of the image forming device 30 will be described in detail.

Figure 2:
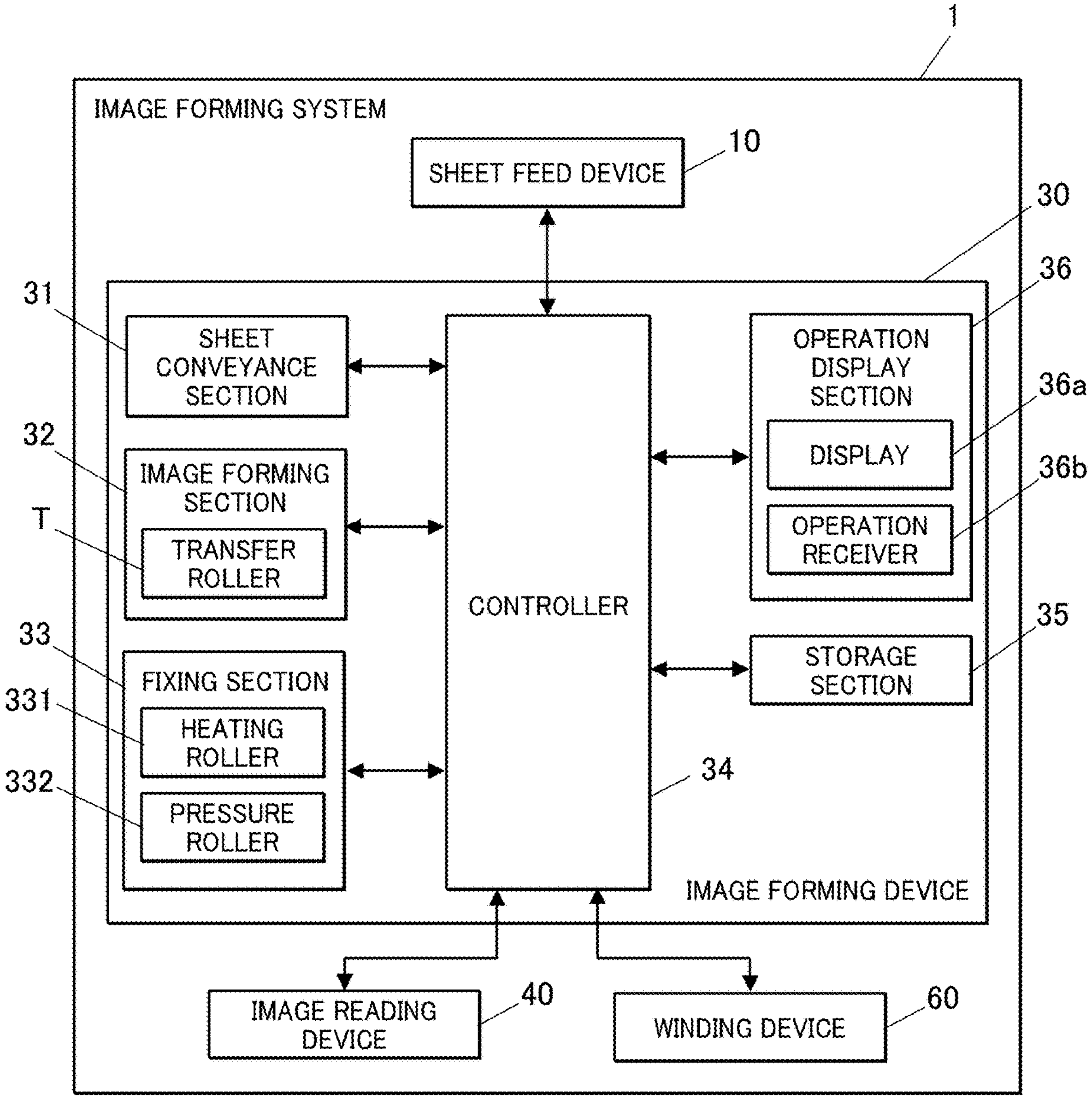
FIG. 2 is a functional block diagram illustrating the control configuration of an image forming device according to the present embodiment.

FIG. 2 is a functional block diagram illustrating the control configuration of the image forming device 30.

As illustrated in FIG. 2, the image forming device 30 includes a sheet conveyance section 31, an image forming section 32, a fixing section 33, a controller 34 (hardware processor), a storage section 35, and an operation display section 36, for example.

The sheet conveyance section 31 conveys the continuous sheet P inside the image forming device 30. For example, with rollers, the sheet conveyance section 31 conveys the continuous sheet P, which has been conveyed from the sheet feed adjustment section 20, to the image forming section 32 and conveys the continuous sheet P that has passed through the image forming section 32 and the fixing section 33 to the image reading device 40.

The image forming section 32 forms a toner image by the electrophotographic process and transfers the toner image onto the continuous sheet P. For example, the image forming section 32 uses photosensitive drums (Y, M, C, and K) and an intermediate transfer belt B as image bearing members (see FIG. 1). The intermediate transfer belt B is an endless belt. The intermediate transfer belt B is wound around and rotatably supported by rollers. The toner images of the respective colors formed on the photosensitive drums (Y, M, C, and K) are sequentially transferred onto the intermediate transfer belt B, so that a toner image (color image) consisting of the superposed layers of the respective colors (Y, M, C, and K) is formed on the intermediate transfer belt B. Next, a bias having a opposite polarity to the polarity of the toner is applied to the transfer roller T, so that the toner image formed on the intermediate transfer belt B is transferred onto the continuous sheet P. Under the control of the controller 34, the transfer roller T is pressed against or separated from the intermediate transfer belt B at predetermined timings.

The fixing section 33 fixes the toner image transferred to the continuous sheet P.

For example, the fixing section 33 includes a pair of rollers consisting of a heating roller 331 and a pressure roller 332 for holding the continuous sheet P in between.

The heating roller 331 is heated to a predetermined temperature by a heater as a heat source.

Under the control of the controller 34, the pressure roller 332 is pressed against or separated from the heating roller 331 at predetermined timings.

The continuous sheet P on which the toner image has been transferred receives heat and pressure when passing through the nip part between the heating roller 331 and the pressure roller 332. Thus, the toner image is melted and fixed.

A temperature sensor is provided in the vicinity of the outer peripheral surface of the pressure roller 332. The temperature sensor can measure the temperature in the vicinity the outer peripheral surface of the pressure roller 332 as the temperature of the fixing section 33.

The controller 34 includes, for example, a central processing unit (CPU), and a random access memory (RAM). The CPU of the controller 34 reads various programs stored in the storage section 35, such as a system program and a processing program, loads the programs in the RAM, and executes various processes in accordance with the loaded programs.

The storage section 35 is constituted of a hard disk drive (HDD) or a semiconductor nonvolatile memory, for example.

The storage section 35 stores various programs including the system program and the processing program to be executed by the controller 34 and data necessary for executing these programs. The above-described data includes a print counting position setting table 351 (described later), for example.

The operation display section 36 includes a display screen, a display 36*a* that displays various kinds of information on the screen, and an operation receiver 36*b* for a user to input various kinds of instructions.

The operation display section 36 is used as a print counting position setting unit when the print counting position (the position at which prints are counted) is determined in a print counting process (described later, see FIG. 3), for example.

In the present embodiment, the controller 34 centrally controls the entire image forming system 1 as shown in FIG. 2. In a different configuration, each of the sheet feeding device 10, the image reading device 40, and the winding device 60 may include a controller. Furthermore, the image forming device 30 may be a multi-function peripheral (MFP) having the copy function, the scan function, the facsimile function, and so forth in addition to the image forming function.

[Operation of Image Forming System]

Figure 3:
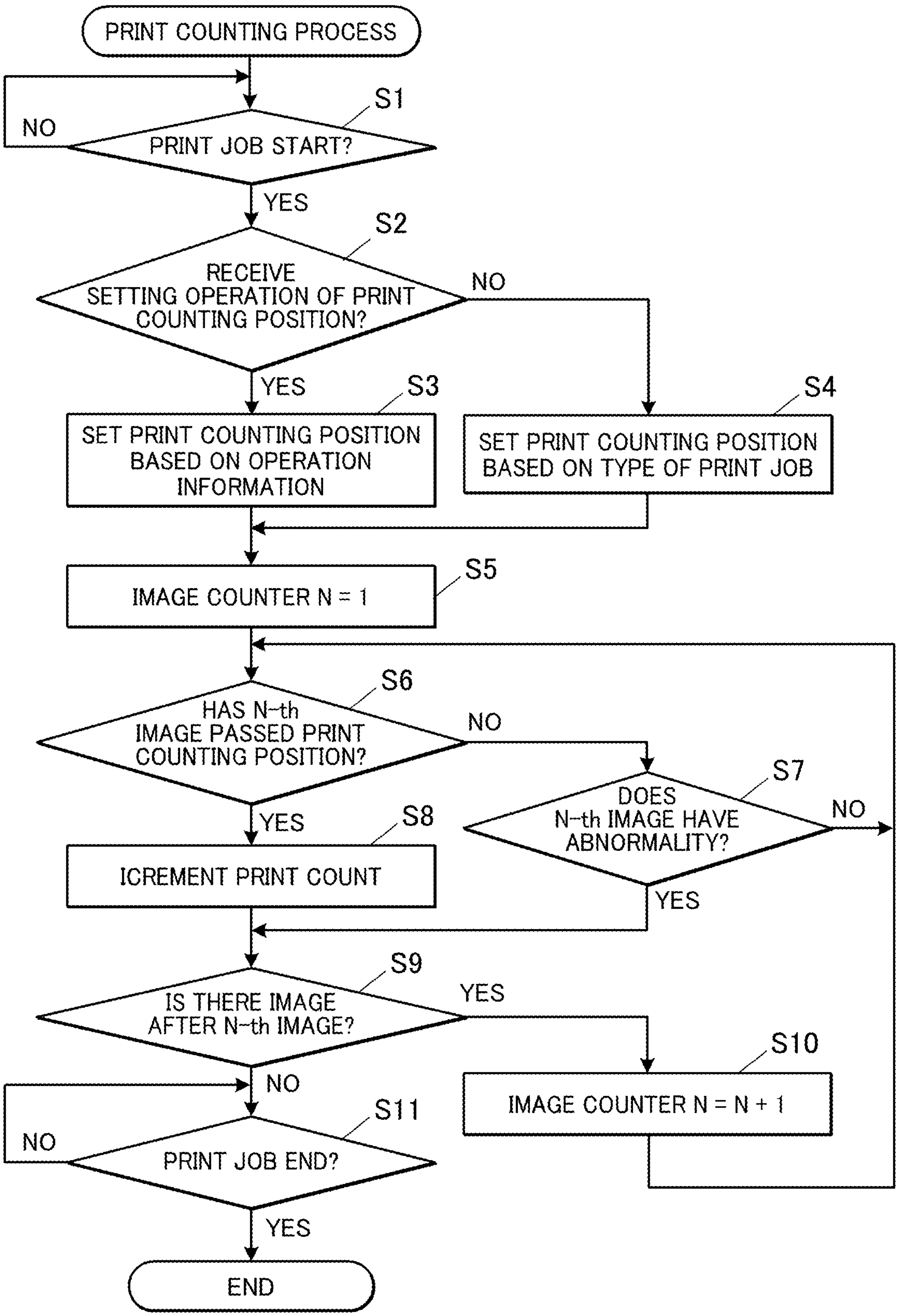
FIG. 3 is a flowchart of the control procedure of a print counting process.

Next, the operation of the image forming system 1 according to the present embodiment will be described. FIG. 3 is a flowchart illustrating the control procedure of the print counting process that is executed by the controller 34 as a print controller. The print counting process starts, for example, when a print job is set by a user operation via the operation receiver 36*b* and an operation instructing the start of the print job is performed.

As shown in FIG. 3, when the print counting process starts, the controller 34 determines whether the print job has started (Step S1).

In Step S1, when determining that the print job has not started yet (Step S1: NO), the controller 34 repeats the determination process of Step S1 until the print job starts.

In Step S1, when determining that the print job has started (Step S1: YES), the controller 34 determines whether the setting operation of setting the print counting position is performed on the operation receiver 36*b* (Step S2).

The setting operation of setting the print counting position can be done by an authorized user when the print job is set. The authorized user is, for example, an administrator in a manufacturer and seller or a leasing company, for example. When the setting operation of setting the print counting position is performed, the display 36*a* displays a print counting position setting screen G in accordance with instructions by the controller 34, as illustrated in FIG. 4. The print counting position setting screen G shows menu items G1 to G4. When one menu item (e.g., the menu item G1 relating to "position of winding section") is selected from the items G1 to G4, the operation information relating to the selection is stored in the storage section 35. For example, when the menu item G1 relating to "position of winding section" is selected, the operation information indicating that the menu item G1 has been selected is stored in the storage section 35.

The menu item G1 relates to "position of winding section", as described above. The "position of winding section" is indicated by a reference sign "P1" in FIG. 1 and is a predetermined position at which the continuous sheet P is wound around the support shaft 61. The menu item G2 relates to "position of sheet cutting worktable". The "position of sheet cutting worktable" is indicated by a reference sign "P2" in FIG. 1 and is a position at which the sheet cutting worktable 62 is disposed (the sheet cutting work position). The menu item G3 relates to "position of inspection table". The "position of inspection table" is indicated by a reference sign "P3" in FIG. 1 and is a position at which the inspection table 51 is disposed (the inspection position). The menu item G4 relates to "position after passing image reading section". The "position after passing image reading section" is indicated by a reference sign "P4" in FIG. 1 and is a predetermined position immediately after the image reading section 41.

Returning to FIG. 3, when determining in step S2 that the setting operation for setting the print counting position has been performed via the operation receiver 36*b* (Step S2: YES), the controller 34 obtains the operation information from the storage section 35 and, based on the operation information, sets the print counting position (Step S3). The controller 34 then proceeds to Step S5.

In step S2, when determining that the operation of setting the print counting position is not performed via the operation receiver 36*b* (step S2: NO), the controller 34 sets the print counting position, based on the type of the started print job (step S4). Specifically, the controller 34 sets the print counting position corresponding to the type of the started print job by using the print counting position setting table 351 stored in the storage section 35. The controller 34 then proceeds to Step S5.

FIG. 5 is a view illustrating an example of the print counting position setting table 351. As shown in FIG. 5, for each type of the print job, the print counting position setting table 351 stores the image stop position at which an image stops in the print job in association with the print counting position. When multiple images are printed, the image stop position is the position where the last image stops. In a normal print job, since the continuous sheet P is delivered to a subsequent procedure, such as processing or delivery, the image stop position for the normal print job is set to the position of the winding section (a predetermined position at which the continuous sheet P is wound around the support shaft 61) in the print counting position setting table 351. Therefore, to correctly count prints, the print counting position for the normal print job is set to the position of the winding section at which an image stops. In a print job in which a chart for manual adjustment is printed (manual adjustment chart print job), the image stop position is set to the position of the sheet cutting worktable (the position at which the sheet cutting worktable 62 is disposed) so that the user can cut out part of the continuous sheet P on which the chart for manual adjustment is printed. Therefore, to correctly count prints, the print counting position for the manual adjustment chart print job is set to the position of the sheet cutting worktable at which an image stops. In a proof image print job, the image stop position is set to the position of the inspection table (the position at which the inspection table 51 is disposed) so that the user can visually check the printed proof image. Therefore, to correctly count prints, the print counting position for the proof image print job is set to the position of the inspection table at which an image stops. In a print job in which a chart for automatic adjustment is printed (automatic adjustment chart print job), since the chart for automatic adjustment is read by the image reading section 41, the image stop position is set to a predetermined position immediately after an image passes through the image reading section 41. Therefore, to correctly count prints, the print counting position for the automatic adjustment chart print job is set to the predetermined position immediately after an image passes through the image reading section 41, the predetermined position at which an image stops.

Returning to FIG. 3, the controller 34 sets the image counter value (N) to "1" (step S5).

Next, the controller 34 determines whether the N-th image has passed the print counting position (step S6). That is, when the image counter value (N) is set to "1", the controller 34 determines whether the first image has passed the print counting position. The print counting position is set in step S3 or step S4.

In Step S6, when determining that the N-th image has not passed the print counting position (step S6: NO), the controller 34 determines whether the N-th image has an abnormality (e.g., occurrence of jam) (step S7).

In Step S7, when determining that the N-th image does not have an abnormality (Step S7: NO), the controller 34 returns to Step S6 and repeats Step S6 and the subsequent process.

In step S7, when determining that the N-th image has an abnormality (Step S7: YES), the controller 34 skips Step S8.

That is, the controller 34 proceeds to step S9 without counting the print corresponding to the N-th image. In step S7, when determining that the N-th image has an abnormality, the controller 34 may stop the print job and end the print counting process.

In step S6, when determining that the N-th image has passed the print counting position (step S6: YES), the controller 34 increments the print count (Step S8). For example, when determining that the first image has passed the print counting position, the controller 34 increments the print count and sets the print count value to "1". Then, the controller 34 proceeds to Step S9.

Next, the controller 34 determines whether there is an image (the (N+1)th image) after the N-th image (step S9).

When determining in step S9 that there is an image ((N+1)th image) after the N-th image (step S9: YES), the controller 34 increments (+1) the image counter value (N) (step S10). The controller 34 then returns to step S6 and repeats step S6 and the subsequent process.

In Step S9, when determining that there is no next image ((N+1)th image) after the N-th image (Step S9: NO), the controller 34 determines whether the print job has ended (Step S11).

In step S11, when determining that the print job has not ended (step S11: NO), the controller 34 repeats the determination process of step S11 until determining that the print job has ended.

In Step S11, when determining that the print job has ended (Step S11: YES), the controller 34 ends the print counting process.

In a case where the image forming system 1 performs the charging process for the print job, the printing fee (=the print count value×price per print) is calculated, based on the print count value counted in the print counting process and the predetermined price per print, and the calculated printing fee is collected from the user. The printing fee is collected every designated period (e.g., every month), and the user pays the charged printing fee by a designated payment method (e.g., bank transfer, bank account withdrawal, or payment by a payment handling slip). The price per print may differ depending on colors of printing. For example, the price per print for monochrome printing may be different from the price per print for color printing. The price per print may be changed as desired by an operation of an authorized user.

[Effects]

As described above, the image forming system 1 includes the sheet conveyance section 31 that conveys the continuous sheet (rolled sheet) P. The image forming system 1 includes the image forming device 30 (image forming section) that forms an image on the continuous sheet P. The image forming system 1 includes the winding device 60 (winding section) that winds the continuous sheet P. The image forming system 1 includes the controller 34 (print count controller) that is capable of changing the print counting position between the image forming device 30 and the winding device 60 on the conveyance path, the print counting position at which prints are counted based on images formed on the continuous sheet P.

Since the print counting position can be appropriately changed between the image forming device 30 and the winding device 60, the prints can be counted appropriately and correctly.

Further, the controller 34 determines the print counting position to be the position at which the last image stops in a print job.

Thus, the controller 34 can avoid failing to count prints when the print counting position is in the downstream of the image stop position; and the controller 34 can also avoid excessively counting prints when the print counting position is in the upstream of the image stop position. Accordingly, prints can be appropriately and correctly counted.

Further, when the final image of the print job stops at the position of the winding section (a predetermined position at which the continuous sheet P is wound around the support shaft 61), the controller 34 determines the print counting position to be the position of the winding section.

Thus, the controller 34 can avoid failing to count prints when the print counting position is in the downstream of the image stop position; and the controller 34 can also avoid excessively counting prints when the print counting position is in the upstream of the image stop position. Accordingly, prints can be appropriately and correctly counted.

Further, in a normal print job, the controller 34 determines the print counting position to be the position of the winding section at which the last image of the normal print job stops (the predetermined position at which the continuous sheet P is wound around the support shaft 61).

Thus, the controller 34 can avoid failing to count prints when the print counting position is in the downstream of the image stop position; and the controller 34 can also avoid excessively counting prints when the print counting position is in the upstream of the image stop position. Accordingly, in a normal print job, prints can be appropriately and correctly counted.

Further, when the last image of the print job stops at the sheet cutting work position at which the user can cut an image formed on the continuous sheet P (the position at which the sheet cutting worktable 62 is disposed), the controller 34 determines the print counting position to be the sheet cutting work position.

Thus, the controller 34 can avoid failing to count prints when the print counting position is in the downstream of the image stop position; and the controller 34 can also avoid excessively counting prints when the print counting position is in the upstream of the image stop position. Accordingly, prints can be appropriately and correctly counted.

Further, when the print job is a manual adjustment chart print job, the controller 34 determines the print counting position to be the sheet cutting work position at which the last image of the manual adjustment chart print job stops (the position at which the sheet cutting worktable 62 is disposed).

Thus, the controller 34 can avoid failing to count prints when the print counting position is in the downstream of the image stop position; and the controller 34 can also avoid excessively counting prints when the print counting position is in the upstream of the image stop position. Accordingly, prints can be appropriately and correctly counted in the manual adjustment chart print job.

Further, when the last image of the print job stops at the inspection position at which the user can check an image formed on the continuous sheet P (the position where the inspection table 51 is disposed), the controller 34 determines the print counting position to be the inspection position.

Thus, the controller 34 can avoid failing to count prints when the print counting position is in the downstream of the image stop position; and the controller 34 can also avoid excessively counting prints when the print counting position is in the upstream of the image stop position. Accordingly, prints can be appropriately and correctly counted.

Further, when the print job is a proof image print job, the controller 34 determines the print counting position to be the inspection position at which the last image of the proof image print job stops (the position at which the inspection table 51 is disposed).

Thus, the controller 34 can avoid failing to count prints when the print counting position is in the downstream of the image stop position; and the controller 34 can also avoid excessively counting prints when the print counting position is in the upstream of the image stop position. Accordingly, prints can be appropriately and correctly counted in the proof image print job.

Further, the image forming system 1 includes the image reading section 41 (image reading device 40) configured to read an image formed on the continuous sheet P on the conveyance path between the image forming device 30 and the winding device 60. When the last image of the print job stops at a predetermined position immediately after the image passes through the image reading section 41, the controller 34 determines the print counting position to be the predetermined position immediately after the image passes through the image reading section 41.

Thus, the controller 34 can avoid failing to count prints when the print counting position is in the downstream of the image stop position; and the controller 34 can also avoid excessively counting prints when the print counting position is in the upstream of the image stop position. Accordingly, prints can be appropriately and correctly counted.

Further, when the print job is an automatic adjustment chart print job, the controller 34 determines the print counting position to be the predetermined position immediately after the image passes through the image reading section 41, the predetermined position at which the last image stops in the automatic adjustment chart print job.

Thus, the controller 34 can avoid failing to count prints when the print counting position is in the downstream of the image stop position; and the controller 34 can also avoid excessively counting prints when the print counting position is in the upstream of the image stop position. Accordingly, prints can be appropriately and correctly counted in the automatic adjustment chart print job.

Further, the image forming system 1 includes the operation display section 36 (the print counting position setting unit) with which a user can set the print counting position. The controller 34 (print count controller) determines the print counting position to be the position set by the operation display section 36.

Accordingly, when a problem occurs in the print count, for example, the user can adjust the print count by setting the print counting position.

Further, since the print count by the controller 34 is used for a charging process, printing fees can be smoothly collected.

[Others]

The description of the above embodiment is an example of the image forming system according to the present invention, and the present invention is not limited to this example.

For example, in the above-described embodiment, the display 36*a* may display the current print counting position to notify the user of the current print counting position while the print job is performed.

In the print counting process (see FIG. 3) of the above-described embodiment, when the print counting position set in Step S3 does not match the image stop position, the display 36*a* may display a notification that the print counting position does not match the image stop position to notify the user thereof.

Further, in the above-described embodiment, the image forming system 1 may be connected to a fee collection device, such as a coin vendor. Each time the print counting process (FIG. 3) is performed, the printing fee may be calculated; and the printing fee may be collected from money inserted to the fee collection device beforehand or by a prepaid method.

Furthermore, in the embodiment described above, when the print count value is derived in the print counting process (FIG. 3), the print counting value may be derived by multiplication of a coefficient corresponding to printing conditions. The printing conditions may be related to: a printing type, such as single-sided or double-sided printing; the size of an image to be printed on the continuous sheet P; and the coverage ratio of images printed on the continuous sheet P, for example.

The detailed configuration and the detailed operation of the components constituting the image forming system 1 in the above-described embodiment can be appropriately modified without departing from the scope of the present invention. Although embodiments of the present invention have been described and shown in detail, the disclosed embodiments are made for purposes of illustration and example only and not limitation. The scope of the present invention should be interpreted by terms of the appended claims.

What is claimed is:

1. An image forming system comprising:

a sheet conveyance section configured to convey a rolled sheet;

an image forming section configured to form an image on the rolled sheet;

a winding section configured to wind the rolled sheet; and a hardware processor capable of changing a print counting position on a conveyance path between the image forming section and the winding section, the print counting position at which a print is counted based on the image formed on the rolled sheet.

2. The image forming system according to claim 1, wherein the hardware processor determines the print counting position to be a position at which a final image of a print job stops.

3. The image forming system according to claim 2, wherein when the last image of the print job stops at a winding position at which the winding section is disposed, the hardware processor determines the print counting position to be the winding position.

4. The image forming system according to claim 3, wherein when the print job is a normal print job, the hardware processor determines the print counting position to be the winding position at which the last image of the normal print job stops.

5. The image forming system according to claim 2, wherein when the last image of the print job stops at a sheet cutting work position at which a user cuts an image formed on the rolled sheet, the hardware processor determines the print counting position to be the sheet cutting work position.

6. The image forming system according to claim 5, wherein when the print job is a manual adjustment chart print job in which a chart for manual adjustment of the image forming section is printed, the hardware processor determines the print counting position to be the sheet cutting work position at which the last image of the manual adjustment chart print job stops.

7. The image forming system according to claim 2, wherein when the final image of the print job stops at an inspection position at which a user checks an image formed on the rolled sheet, the hardware processor determines the print counting position to be the inspection position.

8. The image forming system according to claim 7, wherein when the print job is a proof image print job, the hardware processor determines the print counting position to be the inspection position at which the last image of the proof image print job stops.

9. The image forming system according to claim 2, further comprising:

an image reading section disposed on the conveyance path between the image forming section and the winding section and configured to read an image formed on the rolled sheet, wherein when the last image of the print job stops at a predetermined position immediately after the image passes through the image reading section, the hardware processor determines the print counting position to be the predetermined position immediately after the image passes through the image reading section.

10. The image forming system according to claim 9, wherein when the print job is an automatic adjustment chart print job in which a chart for automatic adjustment of the image forming section is printed, the hardware processor determines the print counting position to be the predetermined position immediately after the image passes through the image reading section, the predetermined position at which the last image of the automatic adjustment chart print job stops.

11. The image forming system according to claim 1, further comprising a print counting position setting unit with which a user sets the print counting position, wherein the hardware processor determines the print counting position to be the position having been set with the print counting position setting unit.

12. The image forming system according to claim 1, wherein when the print counting position is set, the hardware processor causes a display to display the print counting position.

13. The image forming system according to claim 1, wherein:

the hardware processor counts the print at the print counting position, and the count of the print by the hardware processor is used in a charging process.

* * * * *